Figure 1:
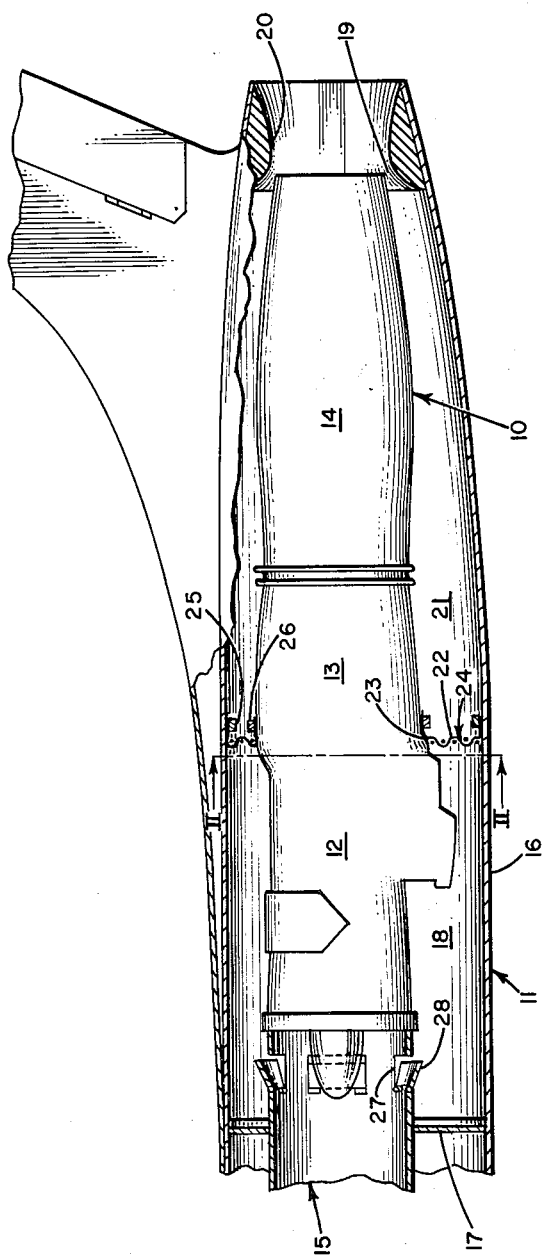

June 6, 1961 S. J. TOWNSEND 2,986,878
FIREWALL
Filed Aug. 8, 1957

INVENTOR.
Samuel J. Townsend
BY
H.C. Goldwire
AGENT

United States Patent Office 2,986,878
Patented June 6, 1961

2,986,878
FIREWALL
Samuel J. Townsend, Dallas, Tex., assignor to Chance Vought Corporation, a corporation of Delaware
Filed Aug. 8, 1957, Ser. No. 676,982
1 Claim. (Cl. 60—39.11)

This invention relates to aircraft and propulsive power plants therefor, and more particularly to a firewall allowing free circulation of air through an enclosure housing a jet engine while preventing the passage of flame from one portion of the enclosure to another.

Briefly described, the invention comprises a firewall dividing an engine enclosure into adjoining compartments, the firewall being provided with a multi-plicity of small openings allowing the relatively unimpeded flow of large volumes of air from one to the other of the compartments. The firewall material is of relatively good thermal conductivity and the openings are made small enough to ensure that gases passing therethrough are cooled below a flame-supporting temperature. To provide the small openings, the firewall may comprise a fine-meshed metallic screen. Means are provided for admitting a large airflow into a forward end of the enclosure and for discharging it, as through an ejector nozzle, at the rear end of the enclosure.

Fires in jet engine and fuel enclosures or compartments of aircraft have tended to be of much more serious consequences than fires in other airframe locations, and because of the sometimes extremely high operating temperatures within jet engine compartments and the necessity of routing fuel, electrical, and hydraulic lines thereinto, the likelihood of the occurrence of fires tends to be relatively great. Fraught with series enough dangers to the aircraft even when confined to the locale of its origin, an engine compartment fire may be accompanied by dangers still more acute since the conflagration is apt to spread to other compartments such as those housing passengers, operating personnel, or fuel.

Since it is generally impossible to entirely preclude the possibility of the leakage of fuels, engine and hydraulic oils, etc., in engine enclosures, it has been the general practice (and, in military aircraft, a normal and specific requirement) to isolate the hotter parts of the engine, notably the combustion section, from other engine parts (such as the compressor and accessory section) forward thereof, the separation being made by a fireproof, substantially leakproof partition or firewall which encircles the engine and extends transversely of the engine compartment, thus subdividing the latter and limiting any fire which might occur to the compartment in which it originated.

While effective in preventing the passage of flame, the firewall tends to aggravate problems of cooling the engine exterior and the surrounding compartment walls and structural members, accessories, equipment, etc. The firewall stops airflow through the engine compartment; hence, the subcompartment housing the hotter parts of the engine must be supplied with a cooling airflow which is substantially independent of cooling provisions which may be employed for the sub-compartment housing cooler parts of the engine. Consequently, cooling air ducts, air scoops, and the like must be employed, and these not only are expensive, but they add weight, take up considerable space, complicate the aircraft interior, and (especially where cooling air scoops are added to the aircraft exterior) tend to add to aerodynamic drag. To eliminate instabilities in airflow to the jet engine aid for other reasons, aircraft have been provided with bypass systems which, when the air supplied by the engine air duct critically exceeds engine air demands, receives enough of the excess air to maintain a satisfactorily smooth flow to the engine, the by-passed air being released overboard. A bypass arrangement which in itself would be desirable in many cases would include the releasing of excess air from the engine air duct into the engine compartment and discharging it from the latter through means located at or near the engine exhaust nozzle, for instance through an ejector which might also serve as a thrust augmenter. Such an arrangement, though desirable because of its simplicity and other advantages, is precluded by the conventional use of a solid, transverse firewall in the engine compartment, which firewall of course blocks the flow of any air released from the air duct (joined to the forward end of the engine) through the engine enclosure to exit means near or at the exhaust nozzle.

It is accordingly, a major object of this invention to provide means effectively preventing the passage of flame but freely allowing the flow of air between forward and aft compartments respectively housing some or all the compressor and combustion sections of an aircraft jet engine.

Another object is to provide means serving a major role as a part of the transverse framework defining a compartment housing an aircraft jet engine and which prevents the passage of flame while permitting the free circulation of air from one end to the other of the compartment.

A further object is to provide an arrangement preventing the passage of flame from one to another of compartments housing an aircraft engine and wherein the compartment walls serve to receive air from the engine air duct and conduct it to a location substantially to the rear of the engine for dumping the air overboard or for supplying it to an ejector, thrust augmenter, or the like.

Yet another object of the invention is to reduce greatly the likelihood of fire in an engine compartment by markedly improving the cooling thereof and thereby keeping combustibles necessarily or inadvertently located therein below their ignition or flash points.

A still further object is to provide at low drag and weight penalties a generous cooling airflow about an aircraft jet engine and likewise to provide ample air for an ejector or thrust augmenter if the latter is installed in the aircraft.

An additional object is to provide, between compartments housing an aircraft jet engine, a firewall which without loss in efficiency is greatly reduced in weight.

Still other objects and advantages will be apparent from the specification and claims and from the accompanying drawing which illustrates an embodiment of the invention.

Figure 2:
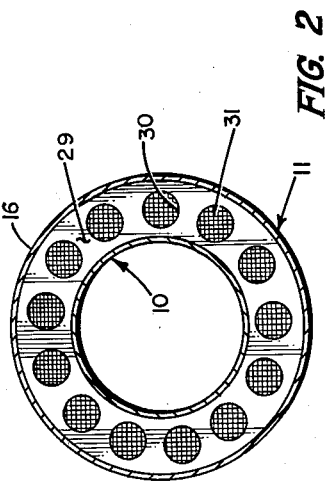

In the drawing,

FIGURE 1 is a longitudinal sectional view of an aircraft to which one form of the invention has been applied; and FIGURE 2 is a transverse sectional view of the aircraft taken as at line II—II of FIGURE 1 and showing a modification of the firewall of the invention.

Referring now to FIGURE 1 of the drawing, an aircraft has a turbojet engine 10 which, according to present practice, may be housed in a nacelle or, as shown in the example, in an enclosure formed by the aft section of the aircraft fuselage 11. The engine 10 has a compressor section 12 and a combustion section 13, the exhaust gases of the latter being discharged rearwardly through a tubular rearward extension 14 of the combustion section which may serve as a tailpipe. Alternatively, the tubular extension 14 may be fashioned in the form of an afterburner. In the balance of this description, the tubular extension 14 is designated an afterburner, but it will be understood that the extension 14 may as readily be a tailpipe if the added thrust of an afterburner is not required. Engine air is provided by an inlet duct 15 communicating at its aft end with the forward end of the compressor section 12.

The interior of the fuselage aft section 11 is separated from the balance of the interior of the aircraft by a transverse bulkhead or equivalent structure 17 which encircles the aft end portion of the air duct 15 and forms a seal between the latter and the skin 16. To allow a goodly flow of air from the air duct 15 (as will be explained) through the fuselage aft section 11 externally of the engine 10, the air must find a ready and ample exit at the aft end of the fuselage. For this purpose, an annular gap 19 may be left between the aft end of the afterburner 14 and the fuselage 11, the gap serving to allow free communication between the interior of the fuselage and the atmosphere. As a means of drawing air through the fuselage aft section 11 and/or augmenting, at higher speeds, the thrust of the engine 10, an annular, convergent-divergent ejector ring 20 may be supplied, as is well known, in the aft end of the fuselage 11 and the engine gases exhausted therethrough.

Heretofore, if the aircraft were to be safeguarded against the possible travel of flame from one to another part of the engine compartments, it has been necessary to provide a solid, substantially gas-proof transverse partition encircling the engine and dividing the engine compartment. In the embodiment of the invention shown in FIGURE 1, the aircraft does not have a solid firewall, but instead has a firewall 24 which comprises a screen 22 extending transversely of the aft section 11 and trimmed to a close fit with the skin 16, associated structural members, etc. The firewall 24 subdivides the engine enclosure formed by the fuselage aft section 11 into forward and aft engine compartments 18, 21 housing, respectively, the engine compressor and combustion sections 12, 13, the aft or combustion section compartment 21 housing also the afterburner 14. An annular opening 23 is provided in the screen 22 in order that the engine 10 may extend therethrough. The relationship of the firewall 24 with the engine 10 and fuselage aft section 11 is such that no air or other gases may pass from one to the other of the compartments 18, 21 except through the screen 22. Any suitable framework may be employed for supporting and holding the screen; for example, outer and inner frames or rings 25, 26 may attach the screen 22 to the fuselage skin 16 and hold it about the engine 10. In order that it will have relatively high thermal conductivity, the screen 22 is preferably made of a metal, and in many cases alloy steel is entirely satisfactory. The screen may be made in the form of a metal plate pierced with a large number of openings, or, preferably, is made of a fine-meshed wire or strip screening material. The openings through the screen 22 must be numerous and large enough to allow a substantially unimpeded airflow therethrough in adequate volume as required for satisfying the needs of any particular aircraft in which the invention is utilized, and must be small enough to ensure enough cooling of gases by absorption of heat therefrom by the screening material to prevent the passage of flame from one to the other of the compartments 18, 21. Because heavy-gage solid metal need not be employed as in conventional firewalls, use being made instead of the screen 22 with its many small openings, the firewall 24 of the invention obviously is much lighter than the usual solid, gas-tight firewall.

Means for providing an airflow into the fuselage aft section 11 externally of the engine may comprise one or more openings 27 providing communication between the engine air duct 15 and the interior of the fuselage aft section 11. The opening or openings 27 may be selectively closed by one or more doors 28 operated by any suitable and convenient mechanism, for example a mechanism such as often employed for operating cowl flaps. In cases where a constant-area bleed for duct air is desired, the doors 28 may be omitted, the opening or openings 27 of course being retained.

When the doors 28 are opened, air passes through the openings 27 from the duct 15 and flows freely through the fuselage aft section 11, thence out the gap 19 into the atmosphere. This flow of air is of great value in cooling the engine 10 and the afterburner 14 as well as the skin and frame members of the fuselage aft section 11. At high speeds, the air made available by the duct 15 to the engine 10 may exceed engine air demands, and excess air admitted into the fuselage 11 from the duct is readily conducted rearwardly through the fuselage and overboard at the ejector 20, the firewall 24 offering very little resistance to passage of the air. Where the design of the ejector 20 is favorable and the flight speed of the aircraft sufficient, the ejector 20, as is generally known, operates in a manner in which the thrust of the engine 10 is significantly augmented.

Thus, rather than supplying expensive, heavy, and bulky internal ducts for handling engine cooling air, bypassed air, and/or air supplied to the ejector 20 for thrust augmentation, the interior of the fuselage aft section 11 itself constitutes a duct which is adequately large and which, as utilized for the purposes enumerated above, costs virtually no added expense or weight penalty. Since no external air scoops are employed aside from the engine air inlet duct 15, drag penalty is at a minimum.

While freely allowing airflow therethrough, the firewall 24 concurrently provides excellent protection against the spreading of flames from one compartment 18 or 21 to the other. If, for instance, a fire starts in the combustion section compartment 21 and tends to spread forwardly into the compartment 18, its progress is blocked by the cooling effect of the screen 22 much in the manner in which flame is prevented from passing by the screen provided in a Davy lamp or by the screen sometimes placed between a Bunsen burner and an object heated thereby. Because the airflow circulates more evenly through virtually all parts of the fuselage aft section 11, as contrasted with the areas of relative stagnation which occur when cooling air is admitted locally through special cooling air tubes or ducts, the engine 10 and the fuselage 11 in which it is housed are much more efficiently cooled, and temperatures in the compartments 18, 21 are more readily kept below the flash points of combustibles which might be present therein. As a consequence, the likelihood of a fire being started, even in the event of a leakage of fuel or oil, is much reduced. Even if a condition arises, however, wherein a fire occurs, the flames are, as explained above, confined by the firewall 24 to the compartment 18 or 21 of their origin.

FIGURE 2 shows a form of the invention wherein, for reasons of structural strength, a strong transverse framework member is needed in the fuselage 11 at the same location as the screen 22 shown in FIGURE 1. This is readily accomplished, according to the invention, by providing a bulkhead 29 of suitable proportions and made of fireproof materials which closely encircles the engine 10 and extends therefrom to the skin 16, with which the outer periphery of the bulkhead is in close contact. Relatively large openings 30, which serve to reduce the weight of the bulkhead 29, are generously provided therein, and these openings are covered by screens 31. The openings 30 are sufficient in size and number to allow the free passage therethrough of a large airflow. The bulkhead 29 thus supplies the structural strength prompting its use and at the same time permits a generous airflow through the fuselage aft section 11. By virtue of the fireproof materials of the bulkhead 29 and the action of the screens 31 covering the bulkhead openings 30, flame is not able to pass the bulkhead 29 in either direction.

While only one embodiment of the invention, together with a modification thereof, has been shown in the accompanying drawing, it will be evident that various further modifications are possible in the arrangement and

I claim:

In combination with an aircraft having a jet engine, a first compartment containing a section of said engine; a second compartment disposed rearwardly of the first and adjacent thereto and containing another section of said engine; a wall having one side forming an exterior surface of said aircraft and another side providing a surface bounding at least part of the perimeter of each of said compartments; a bulkhead surrounding said engine, in dividing relation to said compartments, and in reinforcing and supporting relation to said wall; means for admitting ram airflow into said first compartment around the engine section housed therein; means permitting said airflow to exit from said second compartment; and means permitting said airflow to pass substantially without restriction from said first to said second compartment, the last-named means comprising a plurality of openings through said bulkhead, each of said openings being subdivided into a multiplicity of smaller openings, the smaller openings being too small to allow the passage of flame from one to the other of said compartments; said bulkhead being airtight to prevent the passage of air therethrough except at said openings.

References Cited in the file of this patent

UNITED STATES PATENTS

| | | |
|---|---|---|
| 2,548,794 | Hotz et al. | Apr. 10, 1951 |
| 2,597,253 | Melchior | May 20, 1952 |
| 2,630,678 | Pratt | Mar. 10, 1953 |
| 2,631,796 | Williamson et al. | Mar. 17, 1953 |
| 2,696,712 | Lewis | Dec. 14, 1954 |